Nov. 25, 1941.  F. KREIS  2,263,702
CENTRIFUGAL CLUTCH CONSTRUCTION
Filed Jan. 18, 1940   3 Sheets-Sheet 1

Inventor:
Friedrich Kreis,
By Potter, Pierce & Schaffer,
Attorneys.

Nov. 25, 1941.   F. KREIS   2,263,702
CENTRIFUGAL CLUTCH CONSTRUCTION
Filed Jan. 18, 1940   3 Sheets-Sheet 2

Inventor:
Friedrich Kreis,
By Potter, Pierce & Scheffler,
Attorneys.

Nov. 25, 1941.　　　F. KREIS　　　2,263,702

CENTRIFUGAL CLUTCH CONSTRUCTION

Filed Jan. 18, 1940　　　3 Sheets-Sheet 3

Inventor:
Friedrich Kreis,
By Potter, Pierce + Scheffler,
Attorneys.

Patented Nov. 25, 1941

2,263,702

UNITED STATES PATENT OFFICE 2,263,702

CENTRIFUGAL CLUTCH CONSTRUCTION

Friedrich Kreis, Berlin-Lichterfelde, Germany, assignor to Gesellschaft zur Konstruktion und Verwertung Automatisch-Mechanischer Getriebe m. b. H., Berlin-Oberschoneweide, Germany Application January 18, 1940, Serial No. 314,534
In Germany January 18, 1939

13 Claims. (Cl. 192—105)

The present invention relates to improvements in centrifugal clutch construction and particularly to centrifugal clutches designed for use in automatic change speed transmissions for motor vehicles.

An object of the invention is to provide a more compact and efficient centrifugal clutch construction in which the spring retracted centrifugal weights are arranged between axially movable clutch plates and operate to draw the latter toward each other to release the clutch against the force of expansion springs which normally tend to separate the plates and engage the clutch, the weights being connected with said plates so as to permit separation of said plates and engagement of the clutch by said expansion springs when the weights move outwardly under the influence of centrifugal force.

Centrifugal clutches have been proposed in which the application pressure is produced by spring force while the centrifugal weights are used only for freeing the path for the clutch springs for producing the application pressure. These clutches however are basically different from that of the present invention, the centrifugal weights are not arranged between the clutch plates and do not move in a path parallel to the clutch plates but on the contrary they are usually located outside the clutch plates and oscillate on axes parallel to the clutch plates so that they require a much greater space. Prior clutches of this type are not suitable to be built into a compact structure together with a number of similar clutches as is required for instance in a multistage automatically shifting gear-wheel change speed gearing, each stage of which is connected to the engine through a separate clutch. The clutches already known therefore cannot be used for a gearing of that kind but are adaptable only as a substitute for the ordinary engine clutch used with hand-shifted gearings.

The centrifugal clutch according to the present invention possesses the added advantage over the prior constructions in that it is disengaged at a lower number of revolutions than engaged. In this way hanging between two successive stages of the gearing is prevented and the gearing can be operated in each stage over a greater speed range.

In accordance with the present invention, the centrifugal weights are carried by levers which are pivotally mounted, the weights being suspended from the same so that they move out contrary to the direction of rotation of the clutch. Experiments have shown that with such a mounting it is possible for the clutch to be disengaged earlier with a higher loading moment.

Control of the application pressure by the centrifugal weights can be accomplished in the clutch according to the invention in various ways. For instance, it is possible to allow the control of the application pressure to occur through the medium of slot guides for the centrifugal weight suspension members, said slots overlapping each other and carried by the clutch plates. The control of the application pressure may also be accomplished by means of threaded sleeves operated by the centrifugal weights and provided at one end with right-hand screwthreads and at the other end with left-hand screwthreads in which threaded studs secured to the inside of the respective oppositely disposed clutch plates engage. The clutch plates are preferably guided by means of telescoping bushings carried thereby and disposed between adjacent screw connections, these bushings serving at the same time as mounts for the swinging arms jointed to the centrifugal weights. The threaded studs arranged on the inside of the clutch plates and engaging the threaded sleeves preferably are made hollow, and both these and the aforementioned guide bushings each enclose a compression spring for exerting the application pressure.

The disengagement of the clutch at a lower number of revolutions than the engagement can be attained by arranging the swinging arms, connected by a pivoted joint to the centrifugal weights, so as to swing out to the neutral position of equilibrium during engagement of the clutch, the weights being started back from the neutral position by a return pulling force effective only at a lower speed of rotation than that necessary to effect engagement. For this purpose, in accordance with one form of the invention, the levers carrying the centrifugal weights or a part of the same, are connected through additional levers with centrifugal weights of an inner centrifugal weight ring, likewise divided up into segments and biased to retracted position by a constricting spring, so that upon movement of these latter centrifugal weights towards the inside at reduced speed, a stop connected to the additional levers instigates the return movement of the levers connected to the main centrifugal weights. According to another form of the invention the swinging arms that are connected by pivotal joints to the centrifugal weights controlling the application pressure can be swung out approximately to the position of equilibrium upon engagement of the clutch and can be held in this position by a pawl device that is released only at a lower number of revolutions than the engagement number of revolutions. This pawl locking arrangement consists of an additional centrifugal weight suspended in a jointed fashion and provided with a notch, this weight being adapted to engage a detent carried on the swinging arm, or the pawl under the action of a spring can engage behind a detent provided on the swinging arm.

The invention will be described more in detail in connection with the accompanying drawings in which preferred constructional forms are illustrated.

Figure 1:
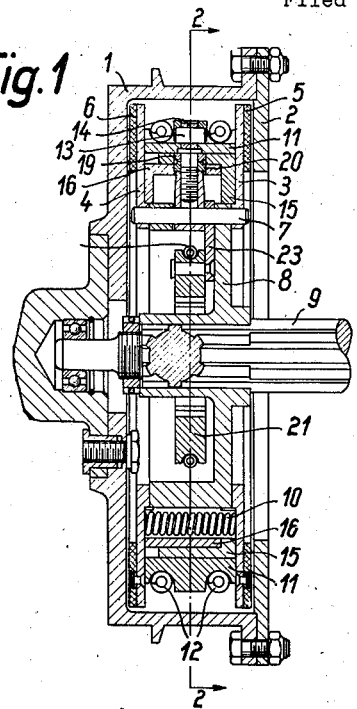
Fig. 1 is an axial section through a centrifugal weight clutch embodying the invention and which may be employed, for instance, for shifting direct gear.
Figure 2:
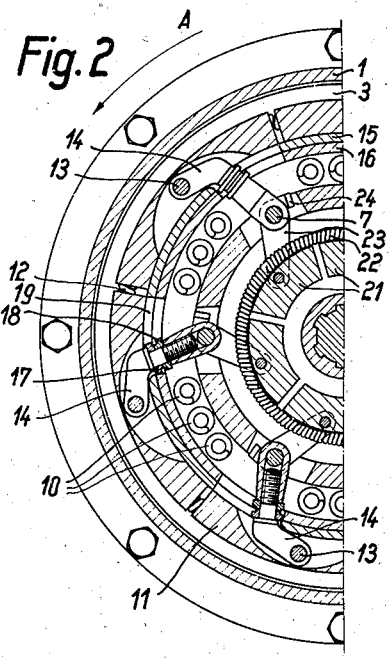
Figs. 2 and 3 are each a cross-section of the same on the line 2—2 of Fig. 1, showing the same in disengaged and engaged condition respectively.
Figure 3:
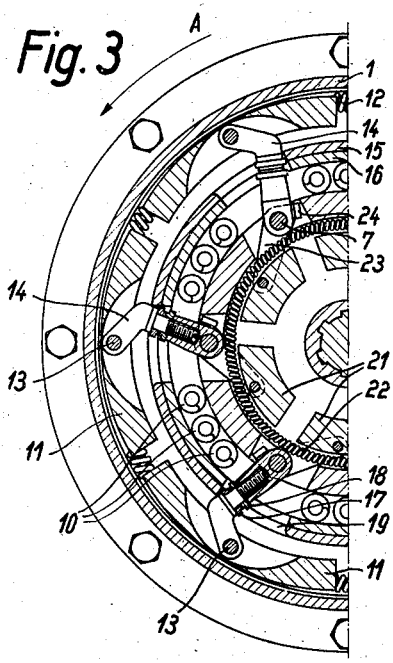

Referring to Figs. 1, 2 and 3, the flywheel of the engine is constructed so as to act also as the outer element or drum 1 of the clutch. The drum 1 is partially closed on the outside by a ring 2. Annular clutch plates 3 and 4 of ring form, on which the friction clutch surfaces 5 and 6 in ring form are carried, are taken along by bolts 7 mounted on the clutch hub 8. The clutch hub 8 is rigidly connected to the driven shaft 9. Between the axially movable clutch plates 3 and 4 are inserted a plurality of application pressure springs 10 disposed in symmetrical arrangement, these being compressed in the disengaged state of the clutch as shown in Figs. 1 and 2. Fig. 3 shows the engaged condition of the clutch, wherein the application pressure springs 10 are partly expanded and thereby produce the coupling pressure between the plates 3 and 4 and the drum 1. The release and tensioning of the springs 10 and resultant shifting of the plates 3 and 4 is caused by a play of forces between the centrifugal force of the centrifugal weights 11 on the one hand and the constricting force of the constricting springs 12 on the other hand, the latter serving to bias the weights to retracted position. If the clutch turns in the direction of the arrow A (Figs. 2 and 3), the weights 11 swing out in the opposite direction upon the attainment of sufficient speed to effect engagement of the clutch. If suddenly, the driving moment to be transferred to the clutch drum 1 is increased by hill travel or sudden application of the brakes to the vehicle, then, as has been shown by experiment, the force of inertia of the weights 11 causes them to disengage earlier than normally so that, as is entirely desirable, a lower gear comes into action earlier with increased loading moment.

The centrifugal weights 11 are pivotally suspended on the ends of levers 14 so as to swing about the bolts 7, the levers being pivoted on the bolts 7 and the weights connected thereto by pins 13. The levers 14 extend through oppositely slanting cam slots in two overlapping annular flanges of angular rings 15 and 16 that are rigidly connected to the inner faces of clutch plates 3 and 4. Bearing rollers 17 and 18 mounted to turn on levers 14 are arranged to engage the slanting sides 19 and 20 of the slanting slots.

The application pressure springs 10 because of their tension tend always to force the clutch plates 3 and 4 away from each other and thereby cause the clutch surfaces 5 and 6 to be applied against the adjacent drum surfaces. Under disengaging conditions (Fig. 2), this is prevented by the retracting force of the constricting springs 12 acting on the weights 11 and through the aforementioned levers 14 and rollers 17 and 18 contacting the sides of the slots 19 and 20. If the number of revolutions of the inner clutch part now increases, the centrifugal weights 11, due to their centrifugal force constantly becoming greater, will swing out around their link bolts 7 against the force of the constricting springs 12, thus swinging the levers 14 toward the other end of the slots 19 and 20. Because of the widening out of the slanting slots 19 and 20, as the levers 14 move therein, the angle rings 15 and 16, and with them the clutch plates 3 and 4 are permitted to move axially under the pressure of the springs 10, and the annular surfaces 5 and 6 are applied against the outer clutch parts 1—2. This state of the clutch is shown in Fig. 3. The weights 11 are all the way out and the respective pivotal axes 13 and 7 are located exactly in a radial line from the central axis so that an increase in the speed of rotation will have no further effect on the position of the weights.

Figure 4:
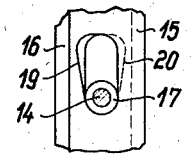
Figs. 4 and 5 are details of the slot guide for the centrifugal weight suspension in the disengaged and engaged condition respectively.
Figure 5:
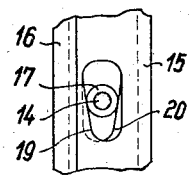

As the number of revolutions of the clutch diminishes, the constricting force of the springs 12 becomes stronger in relation to the centrifugal force of the weights 11 and tends to retract the latter. However, since the constricting force exerts its pressure centrally through the pivots 13 and 7 toward the central axis along radial lines, the retracting force is not effective to move the weights to retracted position and the clutch remains engaged. A separate device is therefore provided for initiating disengagement of the clutch. This device comprises a second or auxiliary ring of weights 21 arranged to force the weights 11 toward disengaging position. The weights 21 are pivotally suspended on the inner ends of levers 23 and are biased to retracted position by a constricting spring 22 which is effective to overcome the centrifugal force of the weights 21 only at a definite number of revolutions per minute less than that necessary to effect engagement of the clutch by outward movement of the weights 11. In the movement of the centrifugal weights 21 inwards under the influence of spring 22 stops 24 on the levers 23 come into contact with the respective levers 14 and swing the latter with the main centrifugal weights 11 out of the locked position of equilibrium. The force of the constricting spring 22 then acts directly on the levers 14 through the levers 23 to swing the same in the direction to cause disengagement of the clutch and the force of the constricting springs 12 is added to the force of the constricting spring 22 and throw the weights 11 to retracted position. Due to arrangement of the slanting slots 19 and 20, the clutch plates 3 and 4 are thereby drawn towards each other against the application pressure of the springs 10. In Fig. 4 is seen the position of the slanting slots and the levers 14 when the clutch is disengaged, and in Fig. 5, the position of the slanting slots and levers 14 when the clutch is engaged.

As will be seen, by selection of the proper strength springs and size of weights, it is easily possible to produce a clutch in which the equilibrium of forces between the centrifugal weights 11 and the constricting springs 12, (by means of which the engagement number of revolutions is determined) occurs at a higher number of revolutions than the equilibrium of forces between the centrifugal weights 21 and the constricting spring 22 (by means of which the disengagement number of revolutions is determined), so that the clutch will engage at one speed and disengage at a different and lower speed, as desired.

Figure 6:
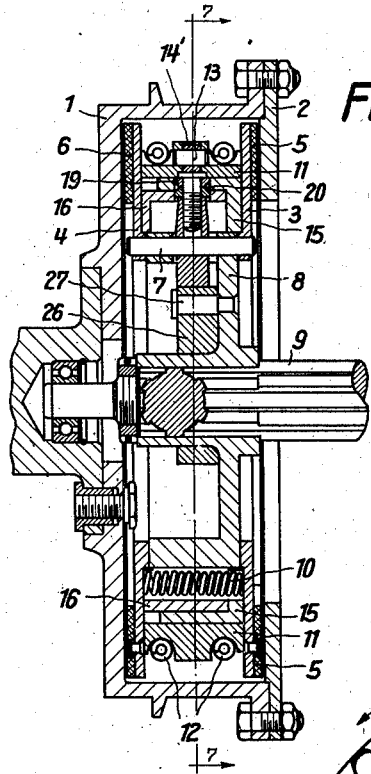
Fig. 6 is an axial section through a clutch embodying a modified means for holding the clutch operating members in and releasing them from engaging position.
Figure 7:
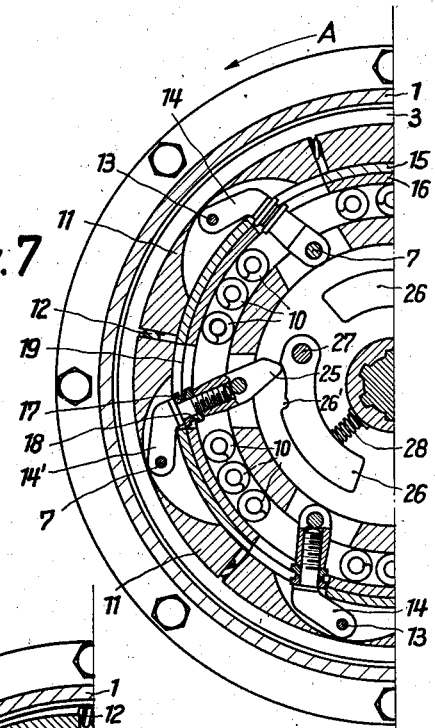
Fig. 7 is a sectional view on the line 7—7 of Fig. 6, showing the clutch disengaged.
Figure 8:
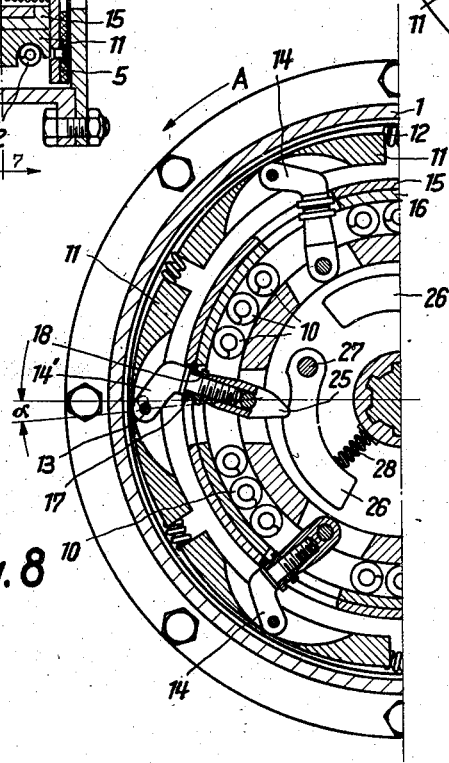
Fig. 8 is a similar view showing the position of the parts when the clutch is engaged.

Figs. 6 to 8 show another constructional example of a centrifugal clutch similar to that shown in Figs. 1 to 5, except that different means are provided for initiating disengagement at the lower speed. In order to engage the clutch at a definite number of revolutions per minute, the centrifugal weights 11 and the two constricting springs 12 are arranged as in Figs. 1 to 5. However in contrast to the constructional form according to Figs. 1 to 5, pawl-like inwardly directed extensions 25 are provided on three of the levers 14 carrying the weights 11, these being indicated as levers 14' in Figs. 7 and 8. Centrifugal weight levers 26 pivoted at one end on studs 27 carried on hub 8 are arranged to contact the pawl ends 25 of the levers 14' and are provided with notches 26' in which the ends 25 engage when the weights 11 and levers 14 and 14' swing to clutch engaging position. The levers and slots 19 and 20 are arranged so that in the engaged position the levers stop against the ends of slots 19 and 20 by means of rollers 17 before a common radial alinement of the pivots 7 and 13 is attained. Thus the radii passing through the respective pivots 7 and 13 are at an angle α (Fig. 8), so that the retracting force of the two constricting springs 12, always has the possibility of retracting the weights 11 when the centrifugal force becomes less. This retraction is prevented by engagement of the pawl-like extensions 25 of the levers 14' in the notches 26' provided in levers 26, in the engaged position of the clutch (Fig. 8). By the single-sided suspension of the levers 26 on the studs 27, a centrifugal force is produced in the levers that holds the levers 26 in locking position with respect to the levers 14' thus keeping the clutch in engagement upon a decrease in speed of rotation below the speed of engagement. The greater the weight of the levers 26, the longer the holding effect will remain effective.

The pawl ends 25 and notches 26' are shaped so that at a desired lower speed, the constricting force of the springs 12 will cause the pawl ends to ride out of the notches 26' against the force of weights 26 and permit the clutch to disengage. The centrifugal force of the levers 26 can be supplemented by installation of a spring 28 under the free end of each of them. It is likewise possible with this arrangement therefore to effect the disengagement of the clutch at any desired lower number of revolutions per minute than the engagement.

Figure 9:
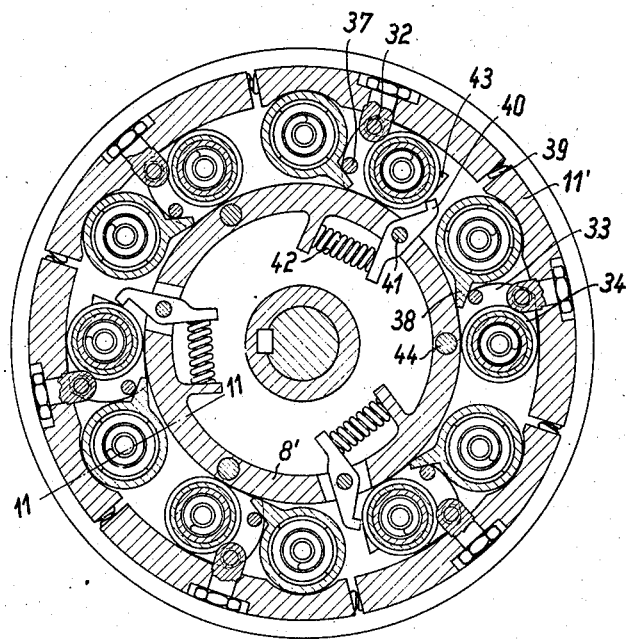
Fig. 9 is a transverse section on the line 9—9 of Fig. 10 illustrating another modification.
Figure 10:
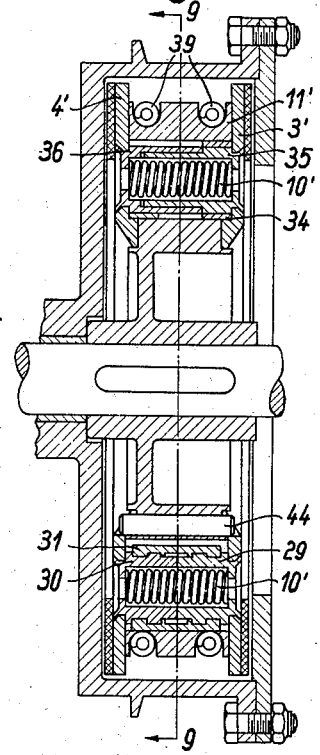
Fig. 10 is an axial section thereof.
Figure 11:
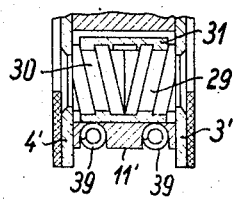
Fig. 11 is a section on the line 11—11 of Fig. 9, with parts in elevation.

In the form of the invention shown in Figs. 9 to 12, the two clutch plates 3', 4' are drawn towards each other by means of alined oppositely threaded hollow studs 29 and 30 arranged in pairs and carried by the plates 3', 4', respectively. The studs 29 and 30 have left and right hand screwthreads respectively and engage in opposite ends of an internally threaded rotatable sleeve or nut 31 which also has left and right hand screwthreads. According to the direction of rotation of the sleeves 31 the plates 3' and 4' are either drawn towards each other against the pressure of the application pressure springs 10', or are let free to be moved apart by the springs 10' to engaging position. Figs. 9 to 11 show the plates drawn together. The hollow studs 29 and 30 form also a housing for expansion springs 10'.

The weights 11' are likewise pivotally suspended on pins 32 carried by fin-like arms 33 projecting from rocking sleeves 34 mounted to turn on telescoping tubular guides or casing members 35 and 36. The tubular guides 35 and 36 are rigidly joined at their ends to the respective clutch plates 3' and 4' and serve also as guide members for the two plates in their axial movement and housings for pressure applying springs 10'. On the projections 33, in addition to the pins 32, studs 37 are likewise mounted each of these resting against an arm 38 carried by the respective nuts 31. The pitch of the threads on the studs 29 and 30 and in the nuts 31 is such that they do not possess a self locking action but will effect rotation of the nuts 31 under the force of the springs 10' acting to separate the plates 3' and 4' if the nuts are not held against rotation or positively rotated in the counter direction. In this clutch there are six of these stud and nut assemblies arranged between the two clutch plates 3' and 4' and between each assembly is a pair of guide tubes 35—36.

During operation, with increasing number of revolutions, the weights 11' swing out against the constricting force of springs 39 and through connection to arms 33 rock the sleeves 34 in the clockwise direction and move studs 37 outwardly thus releasing the pressure on the arms 38 of the sleeve nuts 31. The release of pressure on the arms 38 permits the sleeves 31 to rotate in the counterclockwise direction under the influence of the force of springs 10' acting to move the plates apart as the arms 38 follow the studs 37. Thus as the weights swing out, the plates 3' and 4' are forced apart until the clutch is engaged.

Figure 12:
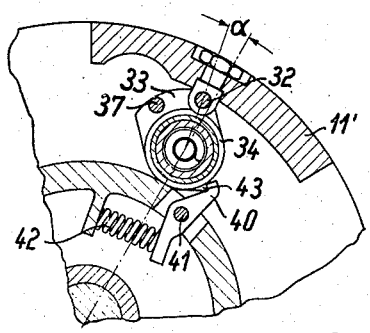
Fig. 12 is a fragmentary view, similar to Fig. 9, showing the position of the parts when the clutch is in engagement.

In Fig. 12 a weight 11' is shown in the thrown-out position. As can be seen the clutch is constructed so that the weights cannot reach the point at which the pivot 32 and axis of the sleeve 34 would be in radial alinement but are stopped so that the pivot line remains inclined in the direction of disengagement the angle α. Upon decreasing number of revolutions, the constricting springs 39 will be able to force the weights again directly to the disengaging position. In order however to obtain a difference between the speed of engagement and the speed of disengagement the weights 11' are held in the engaging position by means of locking detent 43 carried by the rocking sleeves 34 and pivoted locking pawls 40 that are mounted on pivots 41 in the hub section 8'. The locking pawls 40 are biased to locking position under pressure of a spring 42. Only when the number of revolutions has sunk so greatly that the pressure of the two constricting springs 39, tending to separate the detents 43 from the locking pawls 40, overcomes the resistance of springs 42 of the pawls 40, will disengagement of the clutch occur. This takes place in the following manner: upon retraction of the weights 11', the studs 37 on the projections 33 turn back the nuts 31 by pressure on the arms 38 in the clockwise direction and thereby draw the clutch plates together against the tension of the application pressure springs 10'.

The clutch plates 3', 4' are mounted to slide axially on pins 44 carried by the hub 8', these serving also to transmit the driving torque between the plates and the hub.

While preferred embodiments of the invention have been shown and described by way of illustration, various other modifications and changes in the details of construction may be resorted to without departing from the invention within the scope of the appended claims.

I claim:

1. In a centrifugal clutch adapted for automatic connection of one of the driving stages above the low speed driving stage of a gear wheel change speed gearing with the engine in motor vehicles, an outer clutch member, a pair of parallel clutch plates disposed in axially spaced relation and movable axially in opposite directions to engage and disengage said outer clutch member, a plurality of centrifugal weights arranged in circumferentially spaced relation between said plates and movable in paths parallel to said plates, spring means common to all of said weights for biasing said weights to a retracted position against centrifugal force, said weights being movable outwardly by centrifugal force upon attainment of a desired number of revolutions per minute, spring means exerting a separating force on said plates to move them into engagement with said outer clutch member, connections between said weights and said plates effective to draw said plates toward each other when said weights are moved to retracted position by said biasing spring means and to permit separation of said plates by said spring means acting thereon when said weights move outwardly under centrifugal force.

2. In a centrifugal clutch according to claim 1, lever means for mounting said centrifugal weights, said levers being mounted so that said weights in their centrifugal movement outwardly swing in a direction counter to the direction of rotation of the clutch.

3. A centrifugal clutch according to claim 1 in which said connections between said weights and said plates comprise pivoted levers on which said weights are suspended, axially overlapping flange members carried by said plates, said flange members having divergent guiding cam slots disposed in overlapping relation and through which said pivoted levers extend whereby movement of said levers in said slots under the influence of said weights controls the movement of said clutch plates.

4. A centrifugal clutch according to claim 1 in which said connections between said weights and said plates comprise oppositely threaded studs carried by the confronting surfaces of said plates, rotatable nut members having oppositely threaded ends for engaging threadedly opposed studs on the respective plates, and means for translating movement of said weights into rotary motion of said nuts whereby to effect retraction of said plates toward each other or permit separatory movement thereof.

5. In a centrifugal clutch of the character described, an outer clutch member, a pair of parallel clutch plates disposed in axially spaced relation and movable axially in opposite directions to engage and disengage said outer clutch member, a plurality of circumferentially spaced centrifugal weights disposed between said plates and movable in paths parallel to said plates, constricting spring means biasing said centrifugal weights to retracted position against centrifugal force until a given speed is reached, expansion spring means exerting a separating force on said plates in the axial direction tending to move the same into gripping relation with said outer clutch member, opposed oppositely threaded studs carried by the confronting faces of said plates, rotatable nut members having oppositely threaded ends engaging said studs, means for effecting rotation of said nuts in opposite directions in response to inward or outward movement of said weights comprising a plurality of telescoping guide members carried by said plates, rocker arms journalled on said guide members, said weights being carried by said rocker arms, and connections between said rocker arms and said nuts.

6. A centrifugal clutch according to claim 5 in which said telescoping guide members and said threaded studs are of tubular form and said expansion springs acting between said plates are disposed therein.

7. In a centrifugal clutch according to claim 1, a plurality of swinging arms for mounting said weights, articulated connections between said swinging arms and said weights arranged so that upon swinging of said weights to clutch engaging position, said weights and arms occupy a neutral position of equilibrium in which said constricting springs are ineffective to return said weights to retracted position, and means effective at a lower speed of rotation of said clutch than necessary to effect engagement thereof for initiating movement of said weights from said neutral position of equilibrium.

8. In a centrifugal clutch of the character described, an outer clutch member, a hub member, a pair of parallel clutch plates carried by said hub member in axially spaced relation and movable axially in opposite directions to engage and disengage said outer clutch member, a series of lever arms pivoted on said hub member between said plates to swing in a plane parallel to said plates, centrifugal weights pivotally connected to the free ends of said lever arms, said weights being arranged to form a ring between said plates, constricting springs encircling said weights and biasing said weights and lever arms to a retracted position against the action of centrifugal force, said weights and arms being arranged so that upon swinging outwardly to clutch engaging position said weights and arms occupy a neutral position of equilibrium from which said constricting springs are ineffective to return them to retracted position, expansion spring means between said plates exerting an axial separating force thereon to move said plates into engagement with said outer clutch member, connections between said lever arms and said plates for moving said plates toward each other against the action of said expansion springs when said weights and arms are retracted by said constricting springs, a second series of lever arms pivoted on said hub member, centrifugal weights carried by said second series of lever arms, constricting spring means acting on said last mentioned weights to bias them to retracted position, means on the lever arms of said second series adapted to engage the lever arms of said first mentioned series upon inward movement of said last mentioned weights to initiate movement of said first mentioned arms and weights from said neutral position of equilibrium in the direction of retraction.

9. In a centrifugal clutch of the character described, an outer clutch member, a hub member, a pair of parallel clutch plates carried by said hub member in axially spaced relation and movable axially in opposite directions to engage and disengage said outer clutch member, a series of lever arms pivoted on said hub member between said plates to swing in a plane parallel to said plates, centrifugal weights pivotally connected to the free ends of said lever arms, said weights being arranged to form a ring between said plates, constricting springs encircling said weights and biasing said weights and lever arms to a retracted position against the action of centrifugal force, said weights and arms being arranged so that upon swinging outwardly to clutch engaging position said weights and arms occupy a neutral position of equilibrium from which said constricting springs are ineffective to return them to retracted position, expansion spring means between said plates exerting an axial separating force thereon to move said plates into engagement with said outer clutch member, connections between said lever arms and said plates for moving said plates toward each other against the action of said expansion springs when said weights and arms are retracted by said constricting springs, and centrifugal means operative at a lower speed than that necessary to effect movement of said centrifugal weights and arms to said neutral position of equilibrium for releasing said arms and weights from said position.

10. In a centrifugal clutch of the character described, an outer clutch member, a hub member, a pair of parallel clutch plates carried by said hub member in axially spaced relation and for axial movement in opposite directions to engage and disengage said outer clutch member, expansion spring means exerting a separating axial force on said plates tending to move them into engagement with said outer clutch member, a series of lever arms pivoted on said hub, centrifugal weights pivoted on the outer ends of said arms, said arms being pivoted to swing in a plane parallel to said plates, constricting spring means acting on said weights to move the same and said arms to a retracted position against centrifugal force, connections between said arms and said clutch plates effective to move said plates toward each other against the action of said expansion spring means when said weights and arms are retracted and to permit separation of said plates by said expansion spring means when said weights and arms swing outwardly by centrifugal force, means for latching said arms and weights in the outermost position thereof against the retracting force of said constricting spring, and centrifugal means for releasing said weights from latched position at a selected speed of rotation less than the speed of rotation necessary to effect movement of said weights and arms to latching position.

11. A clutch according to claim 10 in which said latching means comprises a pawl end on said lever arms, auxiliary centrifugal weights having notches for engagement by said pawl ends upon movement of said first mentioned weights to latching position, said auxiliary weights acting to release said pawl ends from said notches at said selected speed.

12. In a centrifugal clutch, an outer clutch member, an inner hub member, spaced parallel plates carried by said hub member for axial movement in opposite directions to engage and disengage said outer member, expansion spring means acting between said plates to move them apart and into engagement with said outer clutch member, opposed oppositely threaded studs carried by said plates, a nut having oppositely threaded ends engaging said studs whereby rotation of said nuts in one direction draws said plates together to retracted position against the action of said expansion spring means and rotation in the other direction frees said plates for separation by said spring means, a plurality of swinging arms carried by said hub between said plates, centrifugal weights carried by said arms, constricting spring means acting on said weights, connections between said arms and said nuts for rotating said nuts in the plate retracting direction when said weights are retracted by said constricting spring means and for permitting rotation of said nuts in the plate releasing direction when said weights swing out against the action of said constricting spring means, means for latching said weights in said last mentioned position and effective to retain said weights in said position until the speed of rotation of said clutch falls to a predetermined speed lower than the speed of engagement.

13. A centrifugal clutch according to claim 12 in which said latching means comprises a detent carried by said swinging arms and pivoted spring tensioned latch members carried by said hub for latching engagement with said detents.

FRIEDRICH KREIS.